(12) United States Patent  (10) Patent No.: US 8,353,286 B2
Li  (45) Date of Patent: Jan. 15, 2013

(54) SOLAR WATER HEATER AND METHOD (76) Inventor: Yangsong Li, Webster, TX (US)

( * ) Notice: Subject to any disclaimer, the term of this patent is extended or adjusted under 35 U.S.C. 154(b) by 483 days.

(21) Appl. No.: 12/782,836

(22) Filed: May 19, 2010

(65) Prior Publication Data
US 2010/0319681 A1 Dec. 23, 2010

Related U.S. Application Data (60) Provisional application No. 61/219,754, filed on Jun. 23, 2009.

(51) Int. Cl.
F24J 2/04 (2006.01)
(52) U.S. Cl. ........ 126/640; 126/643; 126/652; 126/655; 126/663; 126/708; 29/890.033
(58) Field of Classification Search ........... 126/640, 126/643, 652, 655, 658, 663, 668, 672, 673, 126/705, 706, 708, 712; 29/890.033
See application file for complete search history.

(56) References Cited

U.S. PATENT DOCUMENTS

| | | | |
|---|---|---|---|
| 4,120,285 A * | 10/1978 | Nugent | 126/653 |
| 4,133,298 A | 1/1979 | Hayama | |
| 4,147,155 A | 4/1979 | Krafft | |
| 4,170,983 A | 10/1979 | Sadler | |
| 4,232,655 A * | 11/1980 | Frissora et al. | 126/585 |
| 4,505,263 A | 3/1985 | Nameda et al. | |
| 4,520,795 A | 6/1985 | Parkyn et al. | |
| 4,579,107 A | 4/1986 | Deakin | |
| 4,587,952 A | 5/1986 | Richardson | |
| 4,674,478 A | 6/1987 | Liebard | |
| 4,987,883 A | 1/1991 | Watkins et al. | |
| 5,555,878 A | 9/1996 | Sparkman | |
| 5,806,511 A | 9/1998 | Hart | |
| 5,823,177 A | 10/1998 | Whitehead | |
| 6,119,682 A | 9/2000 | Hazan | |
| 6,604,521 B2 | 8/2003 | Smith et al. | |
| 6,619,283 B2 | 9/2003 | Ghela | |
| 6,679,247 B1 | 1/2004 | Gozikowski | |
| 6,763,826 B1 | 7/2004 | Gumm et al. | |
| 6,769,427 B1 | 8/2004 | Mourani | |
| 7,220,365 B2 | 5/2007 | Qu et al. | |
| 7,398,779 B2 | 7/2008 | Bowen et al. | |
| 7,431,030 B2 | 10/2008 | Nocera | |
| H2231 H | 8/2009 | Teoh | |

FOREIGN PATENT DOCUMENTS

| CN | 201032302 Y | 3/2008 |
|---|---|---|
| CN | 201037703 Y | 3/2008 |

* cited by examiner

Primary Examiner — Alfred Basichas
(74) Attorney, Agent, or Firm — Kenneth L Nash (57) ABSTRACT A solar water heater includes a number of elongate water heating units which can be interconnected in series. The solar water heater can be installed vertically or inclined to have maximum solar exposure. Each water heating unit can utilize inner and outer glass tubes, which may or may not be a twin glass tube, to collect and conserve solar thermal energy inside. An inner metal water container extends through an opening in the inner and outer glass tubes. Heat transfer elements can be inserted between the inner tube and the metal water container. The solar water heater can work on natural convection and city water pressure.

18 Claims, 3 Drawing Sheets

SOLAR WATER HEATER AND METHOD

The present application claims benefit of U.S. Provisional Application No. 61/219,754, filed Jun. 23, 2009.

BACKGROUND OF THE INVENTION

1. Field of the Invention

The present invention relates generally to solar water heating devices and, in one particular embodiment, to a metal water container, which extends through an opening in otherwise surrounding multiple glass tubes, which may comprise a twin glass vacuum tube.

2. Description of the Prior Art

Hot water represents the second largest energy consumer in American households. By heating household water with solar energy, 40%-70% of a family's water heating bill can be eliminated. The US Department of Energy reports that replacing one electric water heater with solar water heater can offset the equivalent of 40%-100% of the carbon dioxide emissions of one modern car. The use of a solar water heater also reduces nitrous oxide, and sulfur dioxide emissions, which are components of smog.

Various previous solar water heaters, some of which are discussed below, have numerous problems, some of which are discussed below. In some solar water heaters that utilize tubes within rectangular housings for mounting lengthwise on a house, the disadvantages comprise high cost of manufacturing, heavy installation weight of the unit that increases the difficulty of installation, and significant heat loss from the insulated box. In some cases, heat loss during the night can be half of the heat gain during the sunshine daytime. As well, for those units installed on a roof of a house, the roof tends to accumulate significant debris from leaves and the like which become trapped around and on the unit, requiring a great deal of cleaning and maintenance. Systems can be difficult to drain, especially in cold weather, and may have a tendency to leak when under pressure.

Other solar water heaters use complicated heat exchanger pipes, which may be insulated, and a heat transfer media to flow outside of the heat exchanger pipe to other pipes. The disadvantages include the high cost of the whole system, the heat transfer complexity of the system, and overall reliability of the system. Other problems relate to draining and problems with sealing. The installation costs also tend to be relatively high due to the complexity of the system. The potential leaking problem of these units increases significant when the internal pressure increases.

Accordingly, many attempts have been utilized to solve the above discussed problems, some of which are related to the following patents:

U.S. Pat. No. 4,587,952 to Richardson, issued May 13, 1986, discloses a passive solar water heater comprising a collector enclosure having a transparent upper surface and a curved, reflective inner surface and end walls. A storage tank within the collector enclosure is positioned to be heated by the sun's rays both directly and reflected from the inner surface of the collector enclosure. The storage tank has a cylindrical wall and opposed end walls. A first pipe extends through and is attached to one end wall along the longitudinal axis of the storage tank and extends to a position adjacent the cylindrical wall, inside the storage tank. A second pipe extends through the other end wall, along the longitudinal axis of the storage tank, to a second position in the storage tank, also adjacent the cylindrical wall. The first and second positions are generally diametrically opposed to each other. The first and second pipes extend through the end walls of the collector enclosure to support the storage tank within the collector enclosure. The relative positions of the collector enclosure, the storage tank and mounting frame can be fixed as desired.

U.S. Pat. No. 4,147,155 to Krafft, issued Apr. 3, 1979, discloses a device for collecting solar heat energy in which a transparent glass or plastic member, preferably extruded, is provided with the body having upper and lower and peripheral walls with integral passages extending therethrough parallel and spaced from the top and bottom walls and through which fluid is passed. On opposite sides of the passages, dead gas spaces are formed in the body of the glass or plastic material for insulating purposes.

U.S. Pat. No. 4,520,795 to Parkyn, et al., issued Jun. 4, 1985, discloses an apparatus for integral collection and storage of solar thermal energy, that comprises a relatively large storage vessel having side and end walls that absorb solar energy in order to heat its contents; a translucent enclosure surrounding the large storage vessel, for suppression of convective heat losses; and structure on the vessel for the suppression of thermal radiation heat losses from said large storage vessel. The apparatus provides a ratio of thermal mass, as measured in BTU per degree Fahrenheit, to heat-loss coefficient, as measured in BTU per degree Fahrenheit per hour, exceeding 36 hours.

U.S. Pat. No. 4,133,298 to Hayama, issued Jan. 9, 1979, discloses a solar heat collecting apparatus comprising at least one heat collecting element with a cylindrical outer member in which at least its circumferential wall has permeability to solar radiant energy and the two end faces of the cylinder are closed. A cylindrical inner member is disposed in the outer member with the interposition of a thermal insulating space with its either end protruding beyond each end face of the outer member. An absorbing means absorbs the difference between the amounts of heat expansion and contraction of the outer and inner members. The two members and the absorbing means are integrally formed.

U.S. Pat. No. 4,170,983 to Sadler, issued Oct. 16, 1979, discloses a novel solar collector comprising a base and a plurality of upstanding walls extending about the perimeter of the base. An input and an output extend through the walls to communicate with a plurality of liquid conduits integral with the base. A transparent cover is secured to the upstanding walls for covering the base and the plurality of conduits. The conduits and the base with the upstanding walls are constructed of a one-piece molding of a curable material.

U.S. Pat. No. 4,505,263 to Nameda, et al., issued Mar. 19, 1985, discloses a heat collector for a solar heat utilization system comprising a heat collecting pipe and a reflecting plate for focusing solar light on the pipe. This pipe has a first tubular portion for receiving solar light collected by the reflecting plate, and a second tubular portion for receiving direct solar light. The second portion has thermal expansion coefficient larger by a predetermined amount than that of the first portion, and thermally expands at the same rate as the first portion.

U.S. Pat. No. 4,579,107 to Deakin, issued Apr. 1, 1986, discloses a method and device manufactured thereby for economically making solar collectors and concentrators by employing a technique of applying high-efficiency, energy absorptive coatings. The technique is spraying less-than-ultra-pure nickel or chromium, in a molten state, onto a heated surface of a glass absorber substrate so that a thin metallic layer fuses thereon. After spraying, the metallic layer is chemically blackened. An outer glass insulator jacket is hermetically sealed, using a glass-to-glass junction, over the inner glass absorber substrate to provide an insulating space. The spraying technique employed is more economical than by applying the metallic coating by conventional vapor deposition and sputtering techniques which require expensive equipment and ultra-pure metals. Absorption efficiency exceeding 95% with infrared emissions below 0.09% has been achieved. Borosilicate glass is preferred, but other transparent substances can also be used. The technique is employed with both tubular and flat plate type solar collectors and/or concentrators.

U.S. Pat. No. 4,987,883 to Watkins, et al., issued Jan. 29, 1991, discloses an evacuated solar collector tube that has two tubes arranged concentrically and separated by a vacuum. The internal tube is of thin wall steel construction with a selective absorbing coating. The external tube is a hard glass material such as, for example, Pyrex. The vacuum tight seal between the concentric tubes consists of an accordion-pleated semi-rigid material such as copper connected to the inner tube. The semi-rigid material is then fused to a thermally insulating, vacuum tight spacer. Finally, the spacer is fused to the outer glass tube. Additional shatter protection may be derived from a reflective coating extending from midway along the ceramic spacer over the ceramic-glass seal, and along the glass for several inches.

U.S. Pat. No. 5,555,878 to Sparkman, issued Sep. 17, 1996, discloses a solar energy collector comprising a heat absorber to take in radiant energy and transfer the radiant energy to a heat transfer fluid carried thereby. A transparent jacket receives the heat absorber therein. The jacket will allow the radiant energy to pass therethrough and reach the heat absorber. Components are for hermetically sealing the jacket and to form a chamber about the heat absorber. A facility allows the heat transfer fluid to enter and exit from the heat absorber. A structure is provided for exhausting air out of the chamber, so as to produce a vacuum between the jacket and the heat absorber and to insulate the heat absorber from an external environment.

U.S. Pat. No. 4,674,478 to Liebard, issued Jun. 23, 1987, discloses a solar water heater for heating and storing water rough direct passage. The water heater includes a tank which mounted inside an outer structure inside of which is a high vacuum. Pipes acting as elastic water ducts seal water input and outputs which cross the outer glass structure. Recesses with spacers immobilize the tank inside the structure.

U.S. Pat. No. 7,220,365 to Qu, et al., issued May 22, 2007, discloses devices using a medium having a high heat transfer rate. Further disclosed are a heat transfer surface and a heat transfer element utilizing the heat transfer medium. Further disclosed are applications of the heat transfer element.

U.S. Pat. No. 7,431,030 to Nocera, issued Oct. 7, 2008, discloses a solar panel for a water-heater of the type comprising a heat exchanger made of molded synthetic material, having a plurality of passages in which a heat-exchanging fluid can circulate and a translucent cover sheet attached to the exchanger with a clearance, characterized in that the heat exchanger constitutes the brace supporting the panel and consists of two identical half-shells furnished with parallel longitudinal central projecting ribs and one projecting edging rib of greater dimension than a central rib, the two half-shells being bonded or heat sealed so that the central ribs define the abovementioned passages and that the respective edging ribs define a sealed hollow edging frame full of insulating air confined on the periphery of the exchanger.

U.S. Pat. No. 7,398,779 to Bowen, et al., issued Jul. 15, 2008, discloses a thermosiphon solar heater. The thermosiphon solar heater includes a substantially planar collector including a plurality of heat exchanger channels that are positioned next to one another in a parallel relationship. The thermosiphoning solar heater also includes a pair of headers fluidly coupled to the collector. A first header is disposed at a top end of the collector. A second header is disposed at a bottom end of the collector. The thermosiphoning solar heater further includes one or more exposed storage tanks fluidly coupled to the header and positioned in a side by side relationship next to the collector.

U.S. Pat. No. H2,231 to Teoh, published Aug. 4, 2009, discloses a collector core for a solar water-heating-system that includes a plurality of heat-absorbing pipes each of which surrounds a cooler-water return-pipe. The heating-pipes may connect directly to an insulated hot-water storage-tank from which cooler water descends through the return-pipes into the heating-pipes. Upon reaching the end of the return-pipes, the cooler water flows outward into the space between the surrounding heating-pipes and the inner return-pipes. Upon warming, water between the two pipes rises upward back to the hot-water storage-tank thus completing the thermosyphon flow cycle. Preferably, the inner return-pipe is made of polyvinyl chloride ("PVC"), polybutelene ("PB"), or other compressible material which permits collector core operation both in freezing and non-freezing environments. Alternatively, the collector core may be added to an existing solar water-heating panel to improve its operation.

U.S. Pat. No. 6,619,283 to Ghela, issued Sep. 16, 2003, discloses a solar collector pipe that directly conveys fluid to be heated and collects and transfers solar energy to the internal fluid. The solar collector pipe includes a transparent portion for admitting solar energy into the solar collector pipe. Internal to the solar collector pipe is an absorbing portion for absorbing solar energy. A conduit portion is also included and comprises a reflecting surface thereon for reflecting solar energy received through the transparent portion onto the absorbing portion. The transparent portion, the conduit portion, and the absorbing portion together define at least one fluid passageway for conveying the fluid. An internal conduit defines a fluid passageway for conveying the fluid. The internal conduit may be supported within the solar collector pipe and supported by heat-absorbing portions, or may be placed between two solar collector pipe sections to form a single solar collector pipe with an internal conduit extending therethrough.

U.S. Pat. No. 6,604,521 to Smith, et al., issued Aug. 12, 2003, discloses a solar collector pipe that conveys fluid to be heated and collects and transfers solar energy to the internal fluid, thereby maximizing both the amount of energy transmitted to the internal fluid and the peak temperature attainable by that fluid. The solar collector pipe includes a transparent portion for admitting solar energy into the solar collector pipe. Internal to the solar collector pipe is an absorbing portion for absorbing solar energy. A conduit portion is also included and comprises a reflecting surface thereon for reflecting solar energy received through the transparent portion onto the absorbing portion. The transparent portion, the conduit portion, and the absorbing portion together define at least one fluid passageway for conveying the fluid.

U.S. Pat. No. 6,769,427 to Mourani, issued Aug. 3, 2004, discloses a solar water heater comprising a water tank, a solar heating compartment for heating water, and an air pump. The water tank and the solar heating compartment are both substantially cylindrical, and the bottom surface of the heating compartment overlaps the top surface of the water tank. The solar heating compartment has an upper surface and a side surface which are substantially constructed from transparent materials. The heating compartment contains water tubing in communication with water in the water tank and at least one stainless steel parabolic reflector positioned for reflecting incident sunlight upon the water tubing for absorption. The water tubing terminates in at least one hot water outlet. The air pump is in communication with the water tubing within the solar heating compartment. Operation of the air pump causes a stream of water to continuously flow from the water tank to the hot water outlets by the siphoning effect.

U.S. Pat. No. 6,763,826 to Gumm, et al., issued Jul. 20, 2004, discloses a solar water heater. The heater features heat control so that a maximum temperature is automatically controlled. The heater is insulated to maintain a water temperature of water stored therein for long periods of time. The heater includes an insulated lens which transmits most solar radiation incident on its top surface through the lens. An air trap is located below the lens. A heat control valve opens the air trap to surrounding air when a maximum temperature for air within the air trap is exceeded. A heat absorption plate is located below the air trap. The plate is in contact with a heat transfer liquid within a liquid space below the plate. A heat exchanger is positioned within the space and routes water in heat transfer contact with the liquid within the space, while keeping the water isolated from the liquid within the space.

U.S. Pat. No. 6,679,247 to Gozikowski, issued Jan. 20, 2004, discloses a solar water heaters with a solar collector in a decorative structure, and solar collectors comprising a coil of tubing adapted to be disposed in a decorative structure such as a wishing well. A solar water heating system comprises a decorative structure and a coil of tubing disposed within the decorative structure, the coil having a helical shape and being oriented with its axis disposed generally vertically. A method comprises the steps of providing a coil of tubing, the coil having an axis and the tubing of the coil being radially spaced from the axis; disposing the coil in a location receiving sunlight with the coil axis oriented generally vertically; and causing fluid to flow through the coil. A method of making a solar collector for a solar water heating system comprises the steps of providing a supply of flexible tubing and a frame; securing a portion of the tubing to the frame; and rotating the tubing supply and the frame relative to one another so as to dispose a portion of the tubing in successive turns around the frame to form a coil.

U.S. Pat. No. 6,119,682 to Hazan, issued Sep. 19, 2000, discloses a solar energy powered, thermosyphon-circulated water heater and storage device comprising: a flat, tilted solar radiation absorber panel; an insulated hot fluid storage tank; a conduit providing fluid communication between a lower area of the absorber panel and the storage tank, and a further conduit providing fluid communication between an upper area of the absorber panel and an upper area of the storage tank to complete a thermosyphonic path between the panel sand the tank. An extended-length heat-exchanger piping circuit has an entry port for cold, line-pressure water, an outlet port for hot water and arranged within the tank to facilitate the transfer of heat between fluid held in the storage tank and line-pressure water passing through the piping; and, an electric water immersion heater positioned in a housing located in an upper area of the storage tank adjacent the extended length piping circuit.

U.S. Pat. No. 5,823,177 to Whitehead, issued Oct. 20, 1998, discloses a pumpless solar water heater with isolated pressurized storage including a variable volume of solar heated water stored in an insulated indoor tank. The hot water is indirectly pressurized by incoming cold water, which is accumulated separately to maintain a constant total volume without mixing. A small reduction in the total pressure of hot water is maintained, so that water can flow through a solar heat collector and into hot storage without pumps. In one preferred embodiment, the incoming cold water is accumulated in a tank located above an insulated hot water tank. The tanks share a volume of compressed air, which freely passes through a pipe connected between the tops of the two tanks. The transfer of compressed air permits incoming cold water to pressurize and displace hot water without mixing or heat loss. A control valve is opened during sunny hours to permit flow from the upper tank, through a solar heat receiver, and into the lower tank. This collector flow is driven by the reduced elevation pressure of water in the lower tank, so no pump is needed. The air pipe additionally serves as a bypass to deliver cold water after all hot water is used. Means are provided for freeze protection, replacement of lost air, and venting of excess air. The collector may be located on the roof of a building, while the tanks are located lower in the building.

U.S. Pat. No. 5,806,511 to Hart, issued Sep. 15, 1998, discloses a method and apparatus to prevent freezing in the piping and tank of a solar water heating system mounted above a heated space. The supply and return piping to the solar water heater is used in conjunction with a heat exchanger mounted within the heated space below, to create a mechanism for the gentle circulation of water by natural convection, sufficient to prevent freezing in the tank and piping. Bypass pipes that incorporate flow restrictions are introduced between the supply and return piping both in the building and just below the solar tank. This creates a loop in the piping which allows natural convection to occur. The flow restrictions are provided so as not to short circuit the normal water flow under conditions of hot water demand.

Chinese patent number 201037703Y, to Huang Yongsheng issued Mar. 19, 2008, discloses a solar water heater which comprises a glass vacuum tube with an end disposed in an end box, a sealing plug which goes into the open end of the vacuum tube, the sealing plug being attached to the anchor board with screw, and a number of vacuum tubes, which are connected in series by connecting hoses and pressure relief hoses. There is an overflow outlet on the top vacuum tube of the solar water heater. There is an outlet on the bottom vacuum tube of the solar water heater. The solar water heater has a large diameter vacuum tube as a storage tank. The solar water heater can be installed with different angles on the top of roof or vertically installed on the building wall.

Chinese patent number 201032302Y, to Duanquiao et al., issued Mar. 5, 2008, discloses a solar water heater which comprises two or more storage tanks. The storage tanks together with solar evacuated tubes, and other parts can form the solar water heater. One inlet and one outlet are disposed on the storage tanks. The outlet of a previous storage tank is connected to the inlet of the next storage tank. The storage tanks are connected in series.

The above cited prior art does not disclose suitable solutions to the above discussed problems. Consequently, those skilled in the art will appreciate the present invention that addresses the above and other problems.

SUMMARY OF THE INVENTION

It is a general purpose of the present invention to provide an improved solar water heater.

One possible object of the present invention is to increase efficiency by reducing heat loss after heat gain from the sun.

Yet another possible object of the present invention is to provide an array of interconnectable solar water heater units, which provide a manual drain structure for intermediately positioned water heating units.

These and other objects, features, and advantages of the present invention will become apparent from the drawings, the descriptions given herein, and the appended claims. However, it will be understood that the above listed objects and advantages of the invention are intended only as an aid in understanding certain aspects of the invention, are not intended to limit the invention in any way, and do not form a comprehensive or exclusive list of objects, features, and advantages.

Accordingly, the present invention provides a solar water heater with a plurality of water heating units that are elongate with a length at least three times greater than a diameter thereof. In operation, the plurality of water heating units are preferably oriented between a first angle equal to or greater than fifteen degrees and a second angle equal to or less than ninety degrees.

An inner glass tube and an outer glass tube is utilized as part of the plurality of water heating units. The inner glass tube and the outer glass tube define an evacuated region therebetween. The inner glass tube and the outer glass tube define an opening at one end. In one embodiment, an evacuated twin glass tube, which is a one-piece commercially available tube, provides the inner glass tube and the outer glass tube with the evacuated region formed therebetween.

A metal water container, which may be tubular, is mounted inside of the inner and outer glass tubes and extends through the opening at the one end of the inner and outer glass tubes.

A heat exchanger may comprise a plurality of metal members positioned between the inner glass tube and the metal water container. In one embodiment, the heat exchanger may comprise a plurality of flexible metal films or fins.

A metal flange is secured to each metal water container at one end thereof. A metal base box provides a mount to which the metal flange for each of the plurality of water heating units is secured.

A plurality of fluid interconnections are positioned within the metal base box which fluidly connect between the plurality of water heating units.

Insulation material is also supported within the metal base box and preferably surrounds the plurality of fluid interconnections.

An end seal engagingly seals between the metal water container and the inner glass tube to thereby seal the opening at the one end of the inner glass tube and the outer glass tube. In one embodiment, a twin glass tube that comprises the inner and outer glass tubes will have an open end through which the metal water container extends, whereby the end seal is used to seal between the open end of the twin glass tube and the water container. This embodiment is shown in the drawings.

The solar water heater may further comprise an inlet metal tube and an outlet metal tube within in each metal water container. In one embodiment, the outlet metal tube extends to an upper region of each metal water container whereas the inlet metal tube is shorter than the outlet metal tube and provides input of water at the base of each metal water container.

The plurality of fluid interconnections between the plurality of water heating units connect the inlet metal tube and the outlet metal tube for the plurality of water heating units in series such that a first water heating unit in the series receives water into the solar water heating unit. A last water heating unit provides a heated water output from the solar water heater.

In one embodiment, each water heating unit in series between the first water heating unit and the last water heating unit further comprises a metal drain outlet tube operable to drain water from the associated water heating unit.

The solar water heater may further comprise an upper frame which engages an upper end of the outer glass tube for each of the plurality of water heating units to support the inner glass tube and/or the outer glass tube. In this embodiment, a weight of the inner glass tube and the outer glass tube urges the one end of the twin glass tube or the one end of the inner glass tube and the outer glass tube into sealing engagement with the end seal. The drawings show an embodiment, which uses a twin glass tube that comprises an inner glass tube and the outer glass tube.

The solar water heating unit may further comprise an upper metal base box filled with insulation positioned on top of the base box, which surrounds the end seal for each of the plurality of water heating units.

In one embodiment, the metal flange for each of the plurality of water heating units is welded to each metal water container to seal a bottom portion of each metal water container.

The present invention also provides a method for making a solar water heater, which may comprise steps such as, for example, providing a plurality of elongate water heating units with a length at least three times greater than a diameter thereof, orienting the plurality of water heating units during operation between a first angle equal to or greater than forty-five degrees and a second angle equal to or less than ninety degrees.

Other steps may comprise providing an inner glass tube and an outer glass tube for each of the plurality of water heating units, providing that the inner glass tube and the outer glass tube define an evacuated region therebetween, providing that the inner glass tube and the outer glass tube define an opening at one end of the inner glass tube and the outer glass tube, and/or mounting a metal water container inside of the inner and outer glass tubes for each of the plurality of water heating units.

Other steps may comprise providing that the metal water container extends through the opening at the one end of the inner and outer glass tubes for each of the plurality of water heating units and/or providing a metal flange for each of the plurality of water heating units secured to each metal water container.

The method may comprise providing a metallic heat exchanger between the inner glass tube and the metal water container. In one embodiment, the method may further comprise providing that the heat exchanger comprises a plurality of flexible metal films or fins.

Other steps may comprise providing a metal base box and securing the metal flange for each of the plurality of water heating units to the metal base box.

In one embodiment, the method may comprise providing a plurality of fluid interconnections within or supported by the metal base box which fluidly connect between the plurality of water heating units and/or providing that the base box contains insulation material.

The method may further comprise sealing the opening at the one end of the inner glass tube and the outer glass tube providing an end seal for each of the plurality of water heating units between the metal water container and the inner glass tube.

The method may further comprise providing an inlet metal tube and an outlet metal tube within in each metal water container such that the outlet metal tube extends to an upper region of each metal water container and/or the inlet metal tube is shorter than the outlet metal tube.

The method may further comprise providing that the plurality of fluid interconnections between the plurality of water heating units connect the inlet metal tube and the outlet metal tube for the plurality of water heating units in series such that a first water heating unit in series receives water into the solar water heating unit, and a last water heating unit provides a heating water output from the solar water heater.

The method may further comprise providing that each water heating unit in series between the first water heating unit and the last water heating unit further comprises a separate drain outlet metal tube which leads outside of said solar water heating unit.

The method may further comprise providing an upper frame which engages an upper end of the outer glass tube for each of the plurality of water heating units to support the inner glass tube and the outer glass tube. The weight of the inner glass tube and the outer glass tube then urges the one end of the inner glass tube and the outer glass tube into sealing engagement with the end seal.

The method may further comprise providing an upper metal base box also filled with insulation and/or positioning the upper base box on top of the base box and surrounding the end seal for each of the plurality of water heating units.

The method may further comprise providing that the metal flange for each of the plurality of water heating units is welded to each metal water container to seal a bottom portion of each metal water container.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts and wherein.

DESCRIPTION OF THE PREFERRED EMBODIMENT

Figure 1:
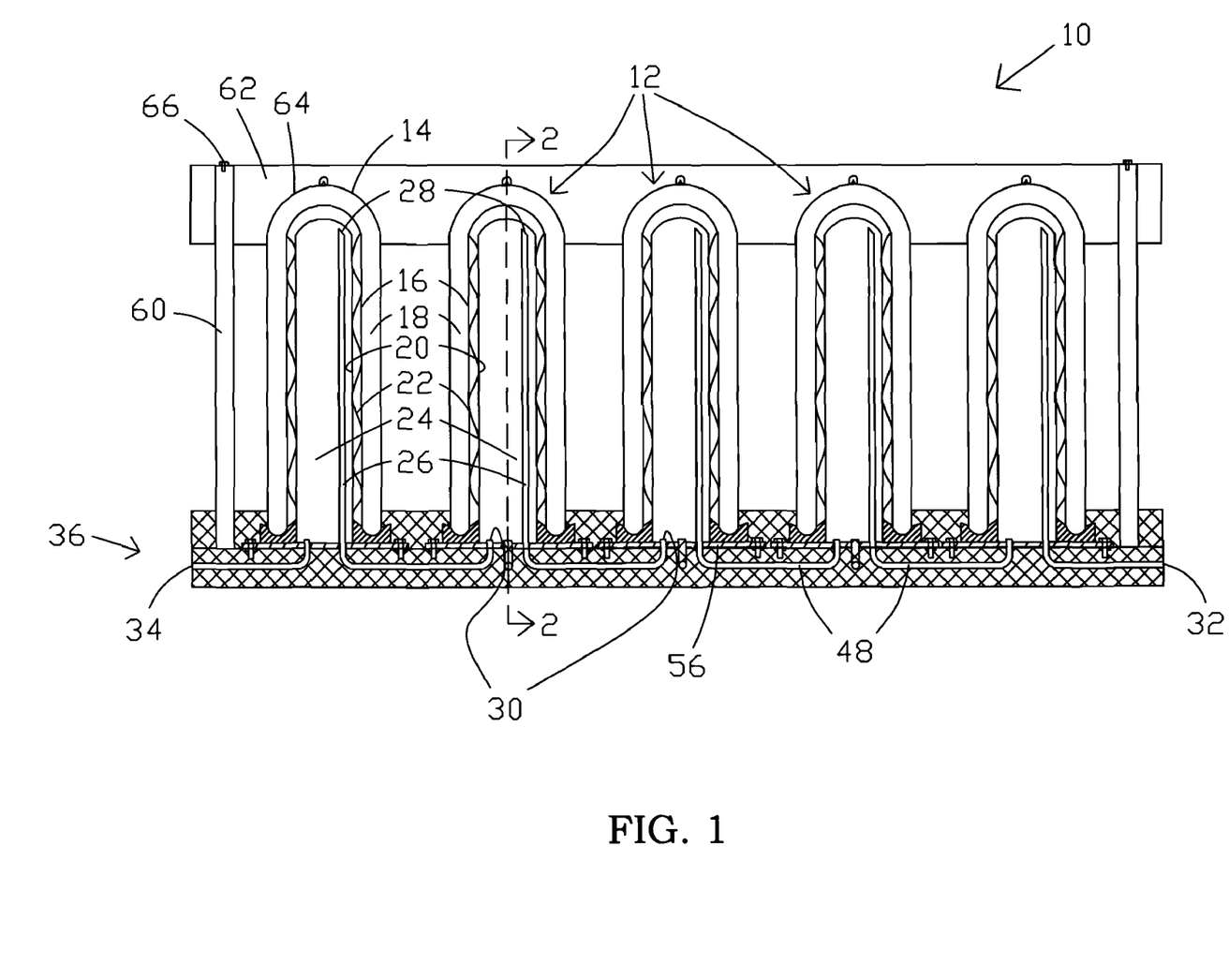
FIG. 1 is an elevational view, in cross-section, showing a plurality of water heating units interconnected in series in accord with one possible embodiment of the invention.
Figure 2:
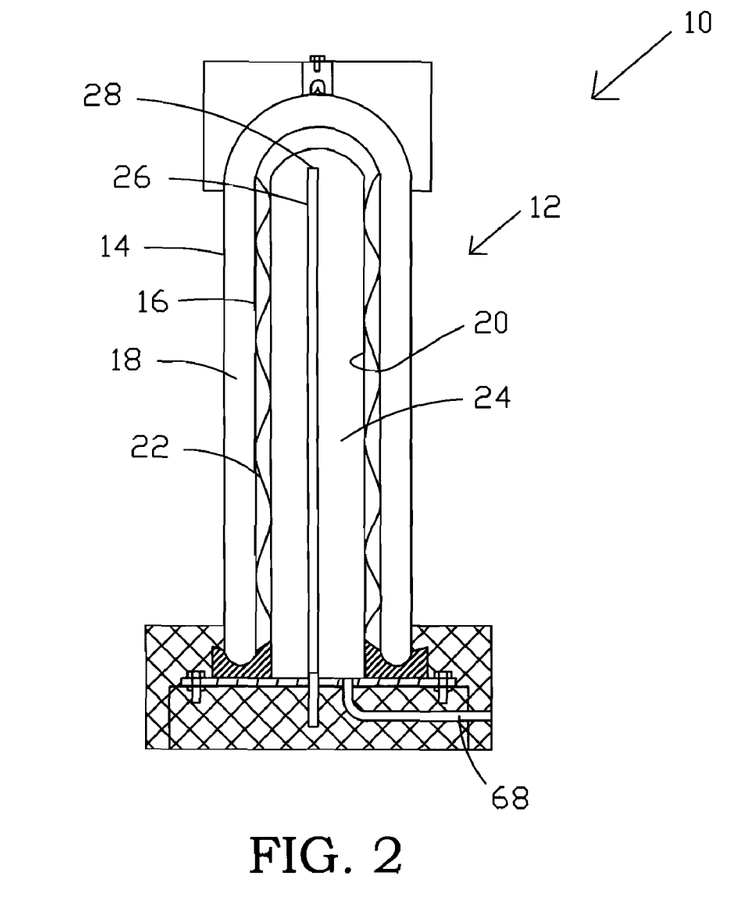
FIG. 2 is an elevational view, in cross-section, taken along lines 2-2 of FIG. 1 in accord with one possible embodiment of the invention.

Referring now to the drawings and, more particularly, to FIG. 1 and FIG. 2, the present invention is directed to solar water heater 10, which in one embodiment may comprise an array of interconnected water heating units 12. In one embodiment, interior positioned water heating units 12 are substantially the same, with interior water heating units in one embodiment optionally additionally comprising piping for draining.

Outer glass coverings and an upper frame for water heating units 12 may be readily separable from solar water heater 10, which in many cases provides easier mounting. Instead of having to handle the entire weight of the solar water heater as is required with many prior art units, the unit can be assembled by carrying lighter components to the installation site. As discussed in more detail hereinafter, solar water heater 10 comprises features that minimize the likelihood of leakage, provide easier installation, increase efficiency, provide a drain structure operable to drain the entire system, and provide less heat loss after heat absorption from the sun.

EXAMPLE 1

In a recent test, in sunlight with the temperature in about forty degree temperatures, water heater 10 reached boiling temperatures at slightly over 100 degrees centigrade, in one afternoon. The temperature was slightly over 100 degrees centigrade due to the pressure created while heating. Various mixing devices may be utilized to limit the hot water temperature stored in water storage tanks, if desired.

Figure 3:
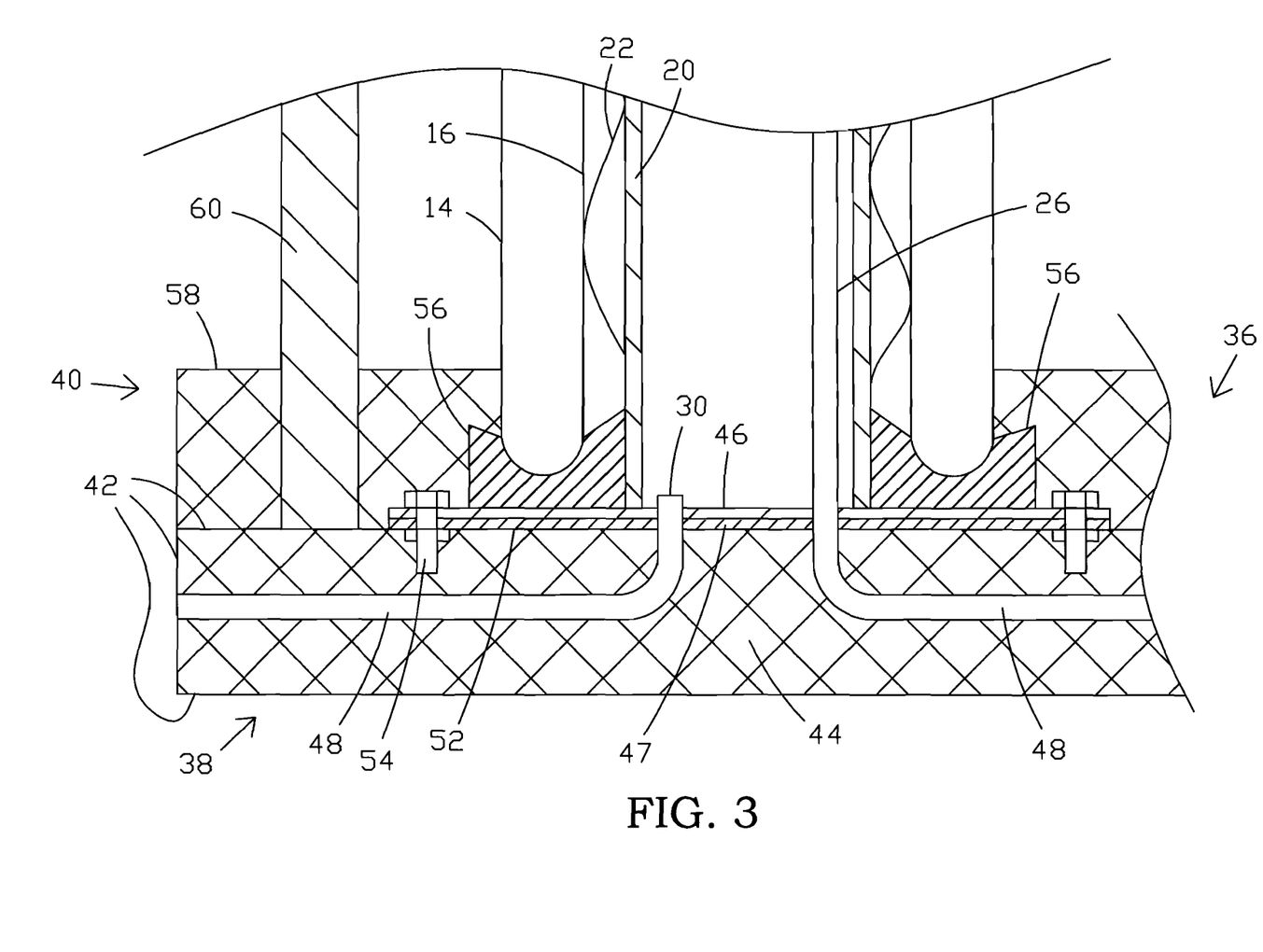
FIG. 3 is an enlarged elevational view, in cross-section, showing a base of a water heating unit of FIG. 1 in accord with one possible embodiment of the invention.

Water heating units 12 preferably comprise outer glass tubes 14 and inner glass tubes 16, with evacuated vacuum regions 18 formed therebetween. In one embodiment, a twin glass tube is utilized that comprises outer glass tube 16 and inner glass tube 14 with the evacuated region formed therebetween. The embodiment using a twin glass tube is shown in FIG. 1-FIG. 3. However, instead of using the twin glass tube, separate inner and outer glass tubes can also be utilized. Inner glass tube 16 comprises coatings, which absorb heat energy. In one embodiment, a AL-N/AL coating was utilized although other coatings might also be utilized to maximize heat absorption. Evacuated vacuum region 18 prevents heat loss of the absorbed heat energy from being lost. As well, the sealing assembly at the base of metal water container 20 and the inner and outer glass tubes 16 and 14, and the insulation provided in base boxes 38 and 40, as best shown in FIG. 2 and FIG. 3, limits heat loss without affecting the high pressure sealing of metal water tank 20, as discussed hereinafter.

Mounted within inner glass tube 16, is metal water container 20, which may comprise, for example, a stainless steel substantially cylindrical tube. Metal water container 20 extends through an open end at the base of inner glass tube 16 and outer glass tube 14. In one embodiment, all water containing structures such as connections, interconnecting flow passages, inlets, drains, and the like comprise stainless steel. It is not required to evacuate the volume of air between inner glass tube 16 and metal container 20 but this increases the heat insulation. Moreover, different levels of vacuum can be evacuated because it is understood that a perfect vacuum is not likely to be formed. However, as used herein an evacuation involves the evacuation of air, which increases the heat insulation property as compared to the heat insulation property of air. Other types of insulation gasses may be utilized between inner glass tube 16 and outer glass tube 14. It has been found that the additional insulation of providing metal water container 20 largely within inner and outer glass tubes 14 and 16 is very effective, especially in conjunction with thermal insulation provided in base region 36, shown in detail in FIG. 3.

Heat is transferred from inner glass tube 16 to metal water container 20 utilizing a heat transfer mechanism. While various heat transfer mechanisms might be utilized, in one embodiment, metal flexible film or strips 22 can be utilized for this purpose. Metal flexible film 22 is advantageously very light and provides a reliable metal heat path between inner glass tube 16 and metal water container 20. Metal flexible film 22 comprises multiple bends to physically contact both inner glass tube 16 and water container 20. Metal flexible film 20 may be wavy, may comprise multiple components or sections, and may comprise various configurations and patterns as desired to maximize heat flow. In one embodiment metal flexible film 20 may comprise corrugated metal strips or other bent metal strips, which may be connected or held together with wiring or the like. However, other types of heat transfer mechanisms, components, fluids, or the like could be utilized, if desired.

Metal water container 20 defines water storage region 24 within each of water heating units 12. In one embodiment for example, the length of water heating units 12 is greater than three or four times the diameter thereof, thus creating an elongate structure. Accordingly, water heating units 12 may comprise elongate tubes. Solar water heater 10 can be oriented vertically or inclined such that water heating units are oriented vertically or inclined with respect to the Earth. If desired, water heating units 12 can be oriented at an angle preferably between at least fifteen degrees and ninety degrees so as to maximize sun exposure. In another embodiment, water heating units are oriented between thirty degrees and ninety degrees with respect to the Earth. In another embodiment, water heating units are oriented between forty-five degrees and ninety degrees with respect to the Earth. Due to vertical orientation or at least inclined orientation, heat rises within metal water container 20 so that the hottest water will be found at the top of each metal water container 20. This feature can be utilized to concentrate heat such that the hottest water is connected to outlet 32.

For example, each outlet tube 26 can have a length slightly less than the length or height of metal water container 20, and has an opening 28, which draws on the hottest water within metal water container 20 at or near the top of metal water container 20 so that the hottest water leaves each water heating unit 12. Likewise, inlet tubes 30 tend to be short so that the cooler water is introduced adjacent to, at or near the bottom of each water heating unit 12. Thus, there is a temperature gradient in each vertical water heating unit 12 from cooler at the bottom to hotter at the top. Thus, the use of vertically mounted elongate tubes provides a way to transfer the hottest water to the outlet of solar water heater 12.

In one possible embodiment, each outlet tube 26 connects to inlet tube 30 in an adjacent water heating unit 12, or connects to solar water heater outlet 32. In this embodiment, outlet tubes 26 and inlet tubes 30 are in series such that water flows from a first water heating unit 12 to an adjacent water heating unit 12, as shown in FIG. 1, until water flows out solar water heater outlet 32. Thus, in this embodiment, the hottest water from the first water heating unit 12 flows to the next water heating unit 12 and the hottest water in this water heating unit flows to the next thereby concentrating the heat in the last water heating unit 12.

However, other interconnections and arrangements between the water heating units could conceivably be utilized. In this embodiment, with series interconnections between water heating units 12, city water pressure connected to solar water heater inlet 34 can be utilized to push water through solar water heater 10. However, other water pressure or drain means, such as a pump connected to the system, or the like, could be utilized. For example, a pump utilized with a swimming pool might be utilized for heating the pool water.

Referring now to FIG. 3, there is shown an enlarged view of a bottom portion of a water heating unit 12. In this embodiment, base 36 comprises two portions, namely base box 38 and base cover 40. Base box 38 comprises metal shell 42, which comprise steel or the like, and is at the bottom of base 36. Metal shell or housing 42 may comprise a generally rectangular shell or housing with a bottom surface, side surfaces and a top surface. Metal shell 42 is designed to be sufficiently strong to reliably physically support water heating units 12. Metal shell 42 is preferably filled with insulation material 44, such as foam or the like, which insulates around the interconnection water flow tubes 48 that connect inlet flow tubes 30 and outlet flow tubes 32. Preferably interconnection water flow tubes 48 are positioned and insulated within base box 38 but could be mounted outside of base box 38.

In one embodiment, metal water container 20 may comprise metal bottom 46 that is welded to metal water container 20 to seal metal water container 20 at the bottom. Inlet tube 30 and outlet tube 26 may be welded or otherwise sealed at metal bottom 46. Flange 52 can be bolted to metal shell 42. As shown in FIG. 3, insulation gasket 47 may be utilized between bottom 46/flange 52, and metal shell 42 to limit heat loss from metal water container 20 into metal shell 42. Insulation gasket may comprise a heat insulation material. Fasteners 54, such as bolts, nuts, rivets, or the like may be utilized to secure flange 52 to metal shell 42. Flange 52 may be part of bottom 46 and is then welded to the bottom of metal water container 20. Thus, metal shell 42 securely supports a plurality of water containers 20. The weld of metal bottom 46 to metal water container 20 provides a strong high pressure seal that can resist high pressure build up within metal water container 20.

Inlet 30 and outlet tube 26 may comprise threaded connectors (not shown) or other connectors to connect with interconnection flow tubes 48, which connect between metal water containers 20.

Seals 56, which thermally seal the bottom end of a twin glass tube which comprises inner glass tube 16 and outer glass tube 14 as shown in FIG. 1-FIG. 3, (or seal between individual inner glass tube 16 and an outer glass tube 14) may comprise any suitable material such as silicon sealing material or the like. Seals 56 may be completely separate from and not the same as the glass seal which fuses together inner glass tube 16 and outer glass tube 14, which may be a twin glass tube, effectively a one-piece tube, comprising vacuum therebetween, as shown in the figures. Thus, inner glass tube 16 and outer glass tube 14 may preferably comprise multiple glass tubes sealed together to maintain the vacuum therebetween.

Thus, inner glass tube 16 and outer glass tube 14 comprise openings at one end through which metal water container 20 extends. Metal water container 20 is thus able to comprise a high pressure weld at the bottom to form a high pressure water vessel while benefiting from the insulation of inner glass tube 16 and outer glass tube 14 over the remainder of the elongate length of metal water container 20 and inner glass tube 16 and outer glass tube 14.

Upper base cover 40 also comprises an outer metal housing or shell 58 and can be mounted above base box 38. Shell 58 may comprise top and side metal walls, and may or may not comprise a metal bottom. Shell 58 is filled with insulating material, such as foam or the like. Thus, the base 36, which covers the bottom region of water heating units 12, may comprise considerable insulation to retain heat energy within solar water heater 10 on the lower end of solar water heater 10.

Inner glass tube 16 and outer glass tube 14 are mounted on base 36 as shown in detail in FIG. 3. Poles, struts or supports 60 support top cover 62 on base 36 as shown in FIG. 1. Top cover 62 may comprise recesses or openings 64 which receive inner glass tube 16 and outer glass tube 14. As one example, top cover 62 may comprise circular openings sized to receive the glass tubes, which may comprise a twin glass tube. Gaskets may be utilized to physically support outer glass tube 14 for protection of the glass tubes at each opening at the top and bottom of the frame. As one example, a gasket may surround or be mounted to a circular opening in a plate of top cover 62 in which the hole or opening is provided for receiving a twin glass tube. Struts 60 and top cover 62 may comprise metal such as steel or the like. Supports 60 may mount to top cover 62 utilizing fasteners 66 or other connection means.

When mounting on the roof or other location, twin glass tubes comprising inner glass tubes 16 and outer glass tubes 14 (or separate inner glass tubes 16 and outer glass tubes 14), may be separated from metal water containers 20. Metal water containers 20 are preferably secured to base 36 prior to transport. By providing separable glass tubes, the installers are able to transport or carry lighter components, which can be very helpful during installation. During final assembly, inner glass tubes 16 and outer glass tubes 14 may then be positioned onto flexible metal film 22 and seals 56, whereupon supports 60 and top cover 62 can then be added to secure the entire unit together.

In one embodiment, drains 68 may be provided especially for water heating units 12 that are not on the inlet or outlet ends of solar water heating unit 10. Thus, if desired or when necessary due to freezing temperatures in long periods without sunlight, all water heating units 12 may be readily drained.

In summary, in one possible embodiment of the invention, the apparatus and methods of the improved vacuum tube may comprise a plurality of units interconnected in series and attached to insulated metal base box 38. Each water heating unit 12 may comprise a twin-glass vacuum tube comprising inner and outer glass tubes 14 and 16, a metal tube, such as metal water container 20, positioned inside of the twin glass vacuum tubes, a plurality of flexible metal films or fins in between the vacuum tube and the metal tube, one or more gaskets 56 to seal the space between the glass vacuum tubes where the metal tube extends out the end opening in the glass vacuum tubes, an inlet 30, an outlet 26, and a drain outlet 68 on one end of metal water container 20 in the middle water heating units 20. Each metal water tube or container 20 may have a flange to allow secure mounting onto metal base box 38. An insulation gasket is then provided in between the metal water container 20 and the metal base box 36. The metal base box is insulated by insulation materials.

In one embodiment of the invention, the metal water container 20 is completely welded and closed with flange 52 to allow it to be secured onto metal base box 38. Each of water heating units 12 can be interconnected in series utilizing piping preferably mounted within insulation within metal base box 38. This feature permits solar water heater 10 to withstand at least the city water pressure or relatively high pressure and prevents potential leakage.

In one possible embodiment of the apparatus and methods of the invention, a number of flexible metal fins 22 are placed in the space in between twin vacuum tubes 14 and 16 and cylindrical metal water container 20 to transfer the heat collected by inner glass tube 16 to metal water container 20 to increase the efficiency of the solar water.

In an exemplary embodiment of the apparatus and methods of the invention, inlet 34, outlet 32, and drain outlets 68 for middle water heating units 12 are provided. One or more gaskets 56 gasket may be disposed around the bottom of twin vacuum tubes 14 and 16 and metal water storage container 20. The weight of twin vacuum tubes 14 and 16 may be utilized to improve the seal with gasket 56.

Because solar water heater 10 can connect to standard city water pressure, pumps, controls, sensors, complicated heat exchangers, or other mechanical components are not required. Solar water heater 10 is easy to install because twin vacuum tubes with inner and outer tubes 14 and 16 can be installed separately instead requiring one big heavy insulated metal box. Solar water heater 10 has better insulation than prior art solar water heaters and still requires little maintenance.

Many additional changes in the details, components, steps, and organization of the system, herein described and illustrated to explain the nature of the invention, may be made by those skilled in the art within the principle and scope of the invention. It is therefore understood that within the scope of the appended claims, the invention may be practiced otherwise than as specifically described.

What is claimed is:

1. A solar water heater, comprising:
   a plurality of water heating units, each water heating unit being elongate with a length at least three times greater than a diameter thereof, said plurality of water heating units being oriented with respect to the Earth during operation between a first angle equal to or greater than fifteen degrees and a second angle equal to or less than ninety degrees;
   an inner glass tube and an outer glass tube for each of said plurality of water heating units, said inner glass tube and said outer glass tube defining a heat insulation region therebetween, said inner glass tube and said outer glass tube defining an opening at one end of said inner glass tube and said outer glass tube;
   a metal water container for each of said plurality of water heating units mounted inside of said inner and outer glass tubes and extending through said opening at said one end of said inner and outer glass tubes;
   a metal flange for each of said plurality of water heating units secured to each metal water container;
   a metal base box to which said metal flange for each of said plurality of water heating units is secured;
   an insulation gasket between metal water container and metal base box;
   a plurality of fluid interconnections positioned within said metal base box which fluidly connect between said plurality of water heating units;
   insulation material supported within said metal base box which surrounds said plurality of fluid interconnections;
   an end seal for each of said plurality of water heating units which engagingly seals between said metal water container and said inner glass tube to seal said opening at said one end of said inner glass tube and said outer glass tube.

2. The solar water heater of claim 1, further comprising an inlet metal tube and an outlet metal tube within in each metal water container, said outlet metal tube extending to an upper region of each metal water container, said inlet metal tube fluidly connecting to a base portion of said outlet metal tube.

3. The solar water heater of claim 2, wherein said plurality of fluid interconnections between said plurality of water heating units connect said inlet metal tube and said outlet metal tube for said plurality of water heating units in series such that a first water heating unit in series receives water into said solar water heating unit, and a last water heating unit provides a heated water output from said solar water heater, and wherein each water heating unit in series between said first water heating unit and said last water heating unit further comprises a metal drain outlet tube operable to drain water away from said solar water heater.

4. The solar water heater of claim 1, further comprising an upper frame which engages an upper end of said outer glass tube for each of said plurality of water heating units to support said inner glass tube and said outer glass tube, whereby a weight of said inner glass tube and said outer glass tube urges said one end of said inner glass tube and said outer glass tube into sealing engagement with said end seal.

5. The solar water heater of claim 1, further comprising a heat exchanger comprising a plurality of metal members positioned between said inner glass tube and said metal water container.

6. The solar water heating unit of claim 5, wherein said heat exchanger comprises a plurality of flexible metal films or fins.

7. The solar water heating unit of claim 1, further comprising an upper metal base box filled with insulation positioned on top of said base box and surrounding said end seal for each of said plurality of water heating units.

8. The solar water heater of claim 1, wherein said metal flange for each of said plurality of water heating units is welded to each metal water container to seal a bottom portion of each metal water container.

9. The solar water heater of claim 1, wherein said inner glass tube and said outer glass tube are joined together to form a single one-piece twin glass tube, which seals said heat insulation region therein.

10. A method for making a solar water heater, comprising:
   providing a plurality of elongate water heating units with a length at least three times greater than a diameter thereof,
   orienting said plurality of water heating units during operation between a first angle equal to or greater than fifteen degrees and a second angle equal to or less than ninety degrees;
   providing an inner glass tube and an outer glass tube for each of said plurality of water heating units;
   providing that said inner glass tube and said outer glass tube define an evacuated region therebetween;
   providing that said inner glass tube and said outer glass tube define an opening at one end of said inner glass tube and said outer glass tube;
   mounting a metal water container inside of said inner and outer glass tubes for each of said plurality of water heating units;
   providing that said metal water container extends through said opening at said one end of said inner and outer glass tubes for each of said plurality of water heating units;
   providing a metal flange for each of said plurality of water heating units secured to each metal water container;
   providing a metal base box;
   securing said metal flange for each of said plurality of water heating units to said metal base box;
   providing a plurality of fluid interconnections within said metal base box which fluidly connect between said plurality of water heating units
   providing that said base box contains insulation material around said plurality of fluid interconnections; and
   sealing said opening at said one end of said inner glass tube and said outer glass tube providing an end seal for each of said plurality of water heating units between said metal water container and said inner glass tube.

11. The method of claim 10, further comprising providing an inlet metal tube and an outlet metal tube within in each metal water container, and providing that said outlet metal tube extends to an upper region of each metal water container, and providing that said inlet metal tube is shorter than said outlet metal tube.

12. The method of claim 11, further comprising providing that said plurality of fluid interconnections between said plurality of water heating units connect said inlet metal tube and said outlet metal tube for said plurality of water heating units in series such that a first water heating unit in series receives water into said solar water heating unit, and a last water heating unit provides a heated water output from said solar water heater, and further comprising providing that each water heating unit in series between said first water heating unit and said last water heating unit further comprise a separate drain outlet metal tube.

13. The method of claim 10, further comprising providing an upper frame which engages an upper end of said outer glass tube for each of said plurality of water heating units to support said inner glass tube and said outer glass tube, wherein a weight of said inner glass tube and said outer glass tube urges said one end of said inner glass tube and said outer glass tube into sealing engagement with said end seal.

14. The method of claim 10, further comprising providing a metallic heat exchanger between said inner glass tube and said metal water container.

15. The method of claim 14, further comprising providing that said heat exchanger comprises a plurality of flexible metal films or fins.

16. The method of claim 10, further comprising providing an upper metal base box filled with insulation and positioning said upper base box on top of said base box and surrounding said end seal for each of said plurality of water heating units.

17. The method of claim 10, further comprising providing that said metal flange for each of said plurality of water heating units is welded to each metal water container to seal a bottom of each metal water container.

18. A solar water heater, comprising:
   a plurality of water heating units, each water heating unit being elongate with a length at least three times greater than a diameter thereof, said plurality of water heating units being oriented during operation between a first angle equal to or greater than forty-five degrees and a second angle equal to or less than ninety degrees;
   an inner glass tube and an outer glass tube for each of said plurality of water heating units, said inner glass tube and said outer glass tube defining a heat insulation region therebetween, said inner glass tube and said outer glass tube defining an opening at one end of said inner glass tube and said outer glass tube;
   a metal water container for each of said plurality of water heating units mounted inside of said inner and outer glass tubes and extending through said opening at said one end of said inner and outer glass tubes;
   a heat exchanger comprising a plurality of metal members positioned between said inner glass tube and said metal water container;
   a metal bottom for each of said plurality of water heating units secured to each metal water container;
   a metal base box to which said metal bottom for each of said plurality of water heating units is secured;
   a plurality of fluid interconnections which fluidly connect between said plurality of water heating units;
   insulation material surrounding said plurality of fluid interconnections;
   an end seal for each of said plurality of water heating units which engagingly seals between said metal water container and said inner glass tube to seal said opening at said one end of said inner glass tube and said outer glass tube;
   an inlet metal tube and an outlet metal tube within in each metal water container, said outlet metal tube extending to an upper region of each metal water container, said inlet metal tube fluidly connecting to a lower portion of said outlet metal tube wherein said plurality of fluid interconnections between said plurality of water heating units connect said inlet metal tube and said outlet metal tube for said plurality of water heating units; and
   a metal drain outlet tube separate from said inlet metal tube and said outlet metal tube operable to drain water out of a group of said plurality of water heating units away from said solar water heater.

* * * * *